United States Patent
Zhang et al.

(10) Patent No.: US 11,240,132 B2
(45) Date of Patent: *Feb. 1, 2022

(54) DEVICE CLASSIFICATION

(71) Applicant: FORESCOUT TECHNOLOGIES, INC., San Jose, CA (US)

(72) Inventors: Yang Zhang, Fremont, CA (US); Siying Yang, Cupertino, CA (US)

(73) Assignee: Forescout Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/861,847

(22) Filed: Apr. 29, 2020

(65) Prior Publication Data

US 2020/0259729 A1    Aug. 13, 2020

Related U.S. Application Data

(63) Continuation of application No. 15/370,249, filed on Dec. 6, 2016, now Pat. No. 10,652,116.

(51) Int. Cl.

| | |
|---|---|
| *H04L 12/26* | (2006.01) |
| *H04L 29/08* | (2006.01) |
| *H04L 29/06* | (2006.01) |
| *H04W 12/00* | (2021.01) |
| *H04W 12/37* | (2021.01) |
| *H04L 12/24* | (2006.01) |
| *H04W 12/71* | (2021.01) |

(52) U.S. Cl.
CPC ............ *H04L 43/065* (2013.01); *H04L 43/04* (2013.01); *H04L 63/0227* (2013.01); *H04L 63/10* (2013.01); *H04L 63/1408* (2013.01); *H04L 63/1433* (2013.01); *H04L 67/16* (2013.01); *H04W 12/00* (2013.01); *H04W 12/37* (2021.01); *H04L 41/046* (2013.01); *H04W 12/71* (2021.01)

(58) Field of Classification Search
CPC ... H04L 43/065; H04L 43/0876; H04L 67/16; H04L 63/1433; H04L 12/26; H04L 29/08
See application file for complete search history.

(56) References Cited

U.S. PATENT DOCUMENTS

| | | | |
|---|---|---|---|
| 6,772,223 B1 * | 8/2004 | Corl, Jr. .................. | H04L 29/06 709/220 |
| 7,991,430 B2 * | 8/2011 | Bagchi ................ | H04L 27/0012 455/552.1 |
| 8,125,908 B2 * | 2/2012 | Rothstein ................ | H04L 47/10 370/235 |
| 9,350,815 B2 | 5/2016 | Agarwal et al. | |
| 2005/0249125 A1 * | 11/2005 | Yoon ..................... | H04L 43/026 370/252 |

(Continued)

OTHER PUBLICATIONS

PCT/US2017/063795, International Search Report and Written Opinion dated Mar. 9, 2018, 10 pages.

*Primary Examiner* — Benjamin M Thieu
(74) *Attorney, Agent, or Firm* — Womble Bond Dickinson (US) LLP

(57) ABSTRACT

Systems, methods, and related technologies for device classification are described. In certain aspects, traffic data associated with a device and data from an external system can be accessed. The data can be processed to determine a device classification for the device. An action can be initiated based on the classification.

19 Claims, 5 Drawing Sheets

(56) References Cited

U.S. PATENT DOCUMENTS

| | | | |
|---|---|---|---|
| 2008/0049642 A1* | 2/2008 | Gudipudi | H04L 41/12 370/254 |
| 2008/0134289 A1 | 6/2008 | McConnell et al. | |
| 2011/0019574 A1 | 1/2011 | Malomsoky et al. | |
| 2011/0302632 A1 | 12/2011 | Garrett et al. | |
| 2012/0246293 A1 | 9/2012 | De Jager et al. | |
| 2013/0173756 A1* | 7/2013 | Luna | H04L 67/2828 709/219 |
| 2013/0179561 A1 | 7/2013 | Tripathi et al. | |
| 2014/0095711 A1 | 4/2014 | Kim et al. | |
| 2014/0304764 A1 | 10/2014 | Banerjee | |
| 2015/0215814 A1* | 7/2015 | Raleigh | H04M 15/66 370/231 |
| 2016/0105531 A1 | 4/2016 | Godfrey et al. | |
| 2016/0180093 A1 | 6/2016 | Goss et al. | |
| 2016/0294839 A1 | 10/2016 | Walline et al. | |
| 2017/0132684 A1 | 5/2017 | Korkalo | |
| 2017/0250879 A1* | 8/2017 | Chadha | G06F 16/24569 |

\* cited by examiner

DEVICE CLASSIFICATION

RELATED APPLICATIONS

This application is a continuation of U.S. patent application Ser. No. 15/370,249, filed on Dec. 6, 2016, which is herein incorporated by reference in its entirety.

TECHNICAL FIELD

Aspects and implementations of the present disclosure relate to network monitoring, and more specifically, to device classification based on information available via a communication network.

BACKGROUND

As technology advances, the number and variety of devices that are connected to communications network are rapidly increasing. The classification of devices connected to a network can be useful for monitoring and securing the communication network in order to prevent unauthorized or rogue devices from accessing network resources.

Some classification methodologies rely on media access control (MAC) addresses and hypertext transfer protocol (HTTP) user-agent strings. These methodologies are particularly limited and narrow in their classification abilities and in many cases may be unable to classify devices. These methodologies further result in frequent false negatives and false positives and thus have low accuracy.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
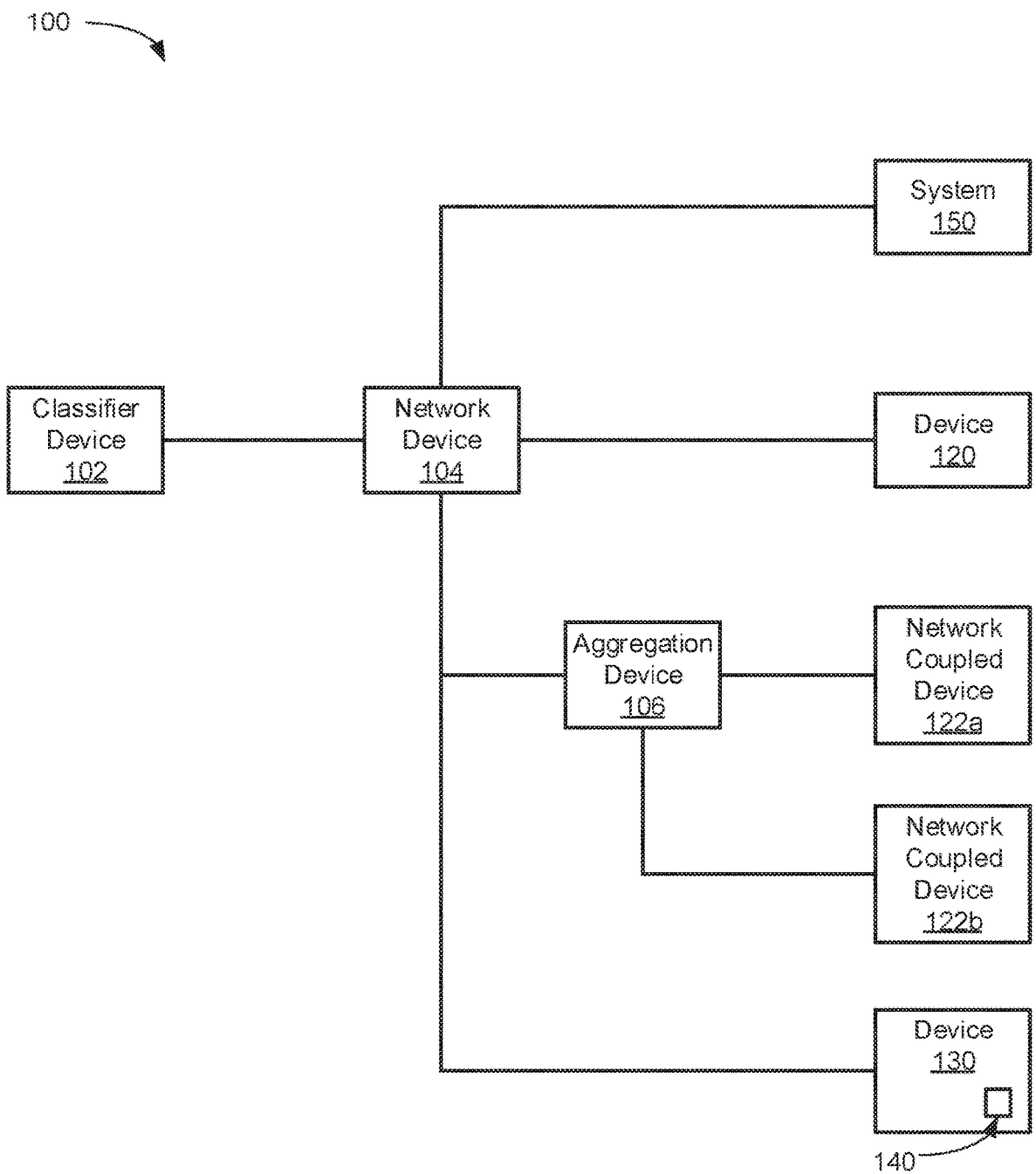
FIG. 1 depicts an illustrative communication network in accordance with one implementation of the present disclosure.

Aspects and implementations of the present disclosure are directed to device classification. The systems and methods disclosed can be employed with respect to network security, among other fields. More particularly, it can be appreciated that access to network resources by unauthorized devices is a significant and growing problem. At the same time, the proliferation of network-connected devices (e.g., smartphones, tablets, wearable devices, etc.) can make it difficult to effectively manage access to network resources for those users or devices that are authorized. Accordingly, described herein in various implementations are systems, methods, techniques, and related technologies, that enable the ongoing monitoring of network devices and activity and provide the ability to control access to network resources (e.g., by defining and employing access policies which dictate the types of devices that are or are not authorized to access certain network resources, the circumstances under which such access is or is not permitted, etc.).

In order to effectively implement network access policies, it may be advantageous to identify, classify, or otherwise determine various aspects, features, or characteristics of devices that are connected to a network or what the devices are (or are not) doing on the network. While it may be possible to determine certain types of identifying information (e.g., IP address, MAC address, etc.) with respect to many types of network-connected devices (e.g., those connected via a Ethernet connection or Wi-Fi™), in certain scenarios it may be difficult to determine with a high degree of accuracy certain characteristics of a particular device (e.g., whether such a device is an access point) and thereby classify the device.

Accordingly, described herein in various implementations are systems, methods, techniques, and related technologies, which enable the classification of devices that are coupled to a network. As described herein, various pieces of information can be collected from the device to be classified, other devices associated with the device to be classified, and from the network to classify the device. In addition, information from third party systems and devices (e.g., external or remote devices) may be used to classify a device.

Accordingly, it can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

Internet of Things (IoT) systems and devices are being used for various applications and locations ranging from households to large industrial environments on an increasingly large scale. The large variety of IoT devices and differences in security capabilities make maintaining security and avoiding data breaches a challenge. It can be hard to protect a device that is not visible on the network. By classifying a device, monitoring, controlling, and applying different security policies on different device groups allows support for different security mechanisms. The classifications can thus be used to apply security protocols in order to achieve end-to-end security for an IoT system. The present disclosure describes, among other things, systems and methods for classification to allow identification and classification of different devices (e.g., IoT devices) using multiple sources of device information.

Current IoT classification methodologies are based on one or two metrics, which are not reliable, not accurate, or not specific enough. This can result in false positives or can only provide high-level rough classifications. For example, if a company manufactures components that include Ethernet to serial interfaces, those components may be used in a variety of products. The manufacture may be assigned a particular MAC address range and as a result a variety of devices may have MAC addresses within the manufacturer's range. For example, a medical device and a toaster may have MAC addresses within the manufacturer's MAC address range because each has an Ethernet interface made by the manufacturer. The MAC addresses with the manufacturer's range thus cannot be used for accurate classification because of the variety of devices that may be in the range.

Embodiments are configured to determine device classification based on combining multiple sources of information to increase classification accuracy. If an agent is present on the device (e.g., a personal computer (PC) or server), the agent can collect and provide detailed device information for device classification. If an agent is not present, e.g., on a mobile device, data from other systems, e.g., a mobile device management (MDM) system, firewall system, or switch system can be used to gather additional information. Traffic and log information can further be used to classify the device (e.g., using one or more heuristics) including when there are no other systems available with information about the device to be classified.

FIG. 1 depicts an illustrative communication network 100, in accordance with one implementation of the present disclosure. The communication network 100 includes a classifier device operable for device classification 102, a network device 104, an aggregation device 106, a system 150, devices 120 and 130, and network coupled devices 122a-b. The devices 120 and 130 and network coupled devices 122a-b may be any of a variety of devices including, but not limited to, computing systems, laptops, smartphones, servers, Internet of Things (IoT) devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, classifier device 102, devices 120 and 130, and network coupled devices 122a-b. Network device 104 may be one or more network switches, access points, routers, firewalls, hubs, etc.

Classifier device 102 may be configured for a variety of tasks including classification of devices 120 and 130 and network coupled devices 122a-b. The classifier device 102 may be a computing system, network device (e.g., router, firewall, network access control (NAC) device, access point, intrusion prevention system (IPS), intrusion detection system (IDS), deception device, cloud-based device, virtual machine based system, etc. Classifier device 102 may communicate with different network devices and security products to access information that may be used for classification of devices coupled to network 100. The data accessed may then be processed, normalized, and analyzed to update device information (e.g., stored in device information database 402). Classifier device 102 may be communicatively coupled to the network device 104 in such a way as to receive network traffic flowing through the network device 104 (e.g., port mirroring).

The classification of devices by classifier device 102 may be based on a combination of one or more pieces of information including traffic analysis, information from external or remote systems (e.g., system 150), information from an agent (e.g., agent 140), querying an aggregation device (e.g., aggregation device 106), and querying the device itself, which are described further herein. Classifier device 102 may be configured to use one or more application programming interfaces (APIs) to communicate with aggregation device 106, device 120, device 130, or system 150.

A device classification heuristic may be used to classify devices into different groups. The groups may be predefined (e.g., default groups that are part of the heuristic) or created dynamically (e.g., on-the-fly after network traffic is received). For example, a group may be dynamically created for a device classification based on the device name based on the device classification not matching predefined groups. The groups may be based on types of devices. For example, one group may be for devices that have a particular operating system, a second group for medical devices (e.g., a magnetic resonance imaging (MRI) device, a X-ray device, or computed tomography (CT) scanning device), and a third group for operational technology devices (e.g., device configured to detect or cause changes in physical processes through direct monitoring or control of physical devices such as valves, pumps, etc.). The classification of devices into groups may allow visual organization of devices within a graphical user interface. Security policies may further be applied on a group basis. Each group may have subgroups. For example, a medical device group could have a subgroups for MRI devices, X-ray machines, and automated dispensing machines.

The data for classification of a device may be updated periodically or as more useful device information becomes available thereby allowing updated, more accurate, and fine-grained device classification.

Device 130 can include agent 140. The agent 140 may be a hardware component, software component, or some combination thereof configured to gather information associated with device 130 and send that information to classifier device 102. The information can include the operating system and version, firmware version, serial number, vendor (e.g., manufacturer), model, asset tag, software executing on a device (e.g., anti-virus software, malware detection software, office applications, web browser(s), communication applications, etc.), services that are active or configured on the device, ports that are open or that the device is configured to communicate with (e.g., associated with services running on the device), MAC address, processor utilization, unique identifiers, computer name, etc. The agent 140 may be configured to provide different levels and pieces of information based on device 130 and the information available to agent 140 from device 130. Agent 140 may be able to store logs of information associated with device 130.

System 150 may be external, remote, or third party system (e.g., separate) from classifier device 102 and may have information about devices 120 and 130 and network coupled devices 122a-b. System 150 may be a vulnerability assessment (VA) system, a thread detection (TD) system, a mobile device management (MDM) system, a firewall (FW) system, a switch system, or an access point system. Classifier device 102 may be configured to communicate with system 150 to obtain information about devices 120 and 130 and network coupled devices 122a-b on a periodic basis, as described herein. For example, system 150 may be a vulnerability assessment system configured to determine if device 120 has a computer virus.

Aggregation device 106 may be configured to communicate with network coupled devices 122a-b and provide network access to network coupled devices 122a-b. Aggregation device 106 may further be configured to provide information (e.g., operating system, device names, etc.) to classifier device 102 about the network coupled devices 122a-b. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122a-b via a wireless connection. Aggregation device 106 may be configured to communicate with network coupled devices 122a-b using a standard protocol with proprietary extensions or modifications.

Aggregation device 106 may further provide log information of activity and properties of network coupled devices 122a-b to classifier device 102. It is appreciated that log information may be particularly reliable for stable network environments (e.g., where the type of devices on the network do not change often).

The names of the devices may be used by classifier device 102 in making a classification determination. For example, the log information may include device names (e.g., LED_bulb_1 and LED_strip_1). The device names may further be used to classify a device into a subgroup. For example, a device name of LED_bulb_1 may be used to classify a device into a light bulb subgroup of a lighting group and a device name of LED_strip_1 may be used to classify a device into a light strip subgroup of a lighting group.

Classifier device 102 may further use device behavior for making a classification determination. The behavior may include the operating schedule of the device. For example, where devices are turned on each morning at 6:00 am or within an hour of sunrise every day, such information may be used to classify a device as a light bulb, where the device is communicatively coupled to a light control bridge device.

Classifier device 102 may further use clustering information (e.g., device information similarities) in determining a device classification. For example, if the first device is classified as a light bulb and a second device has an similar IP address (e.g., in the same IP address range or IP address that is only a few addresses away) or similar on/off time, then the second device may be classified a lighting device.

Classifier device 102 may further use location or proximity information or adjacency heuristics to classify a device. For example, if a refrigeration device was challenging to classify, the fact that is it close to another network coupled device, e.g., an oven, in the kitchen, may be used to accurately classify the refrigerator. As another example, if a Blu-ray device was challenging to classify, information that the Blu-ray device was close to a video game console and a television may be used to accurate classify the Blu-ray device.

Figure 2:
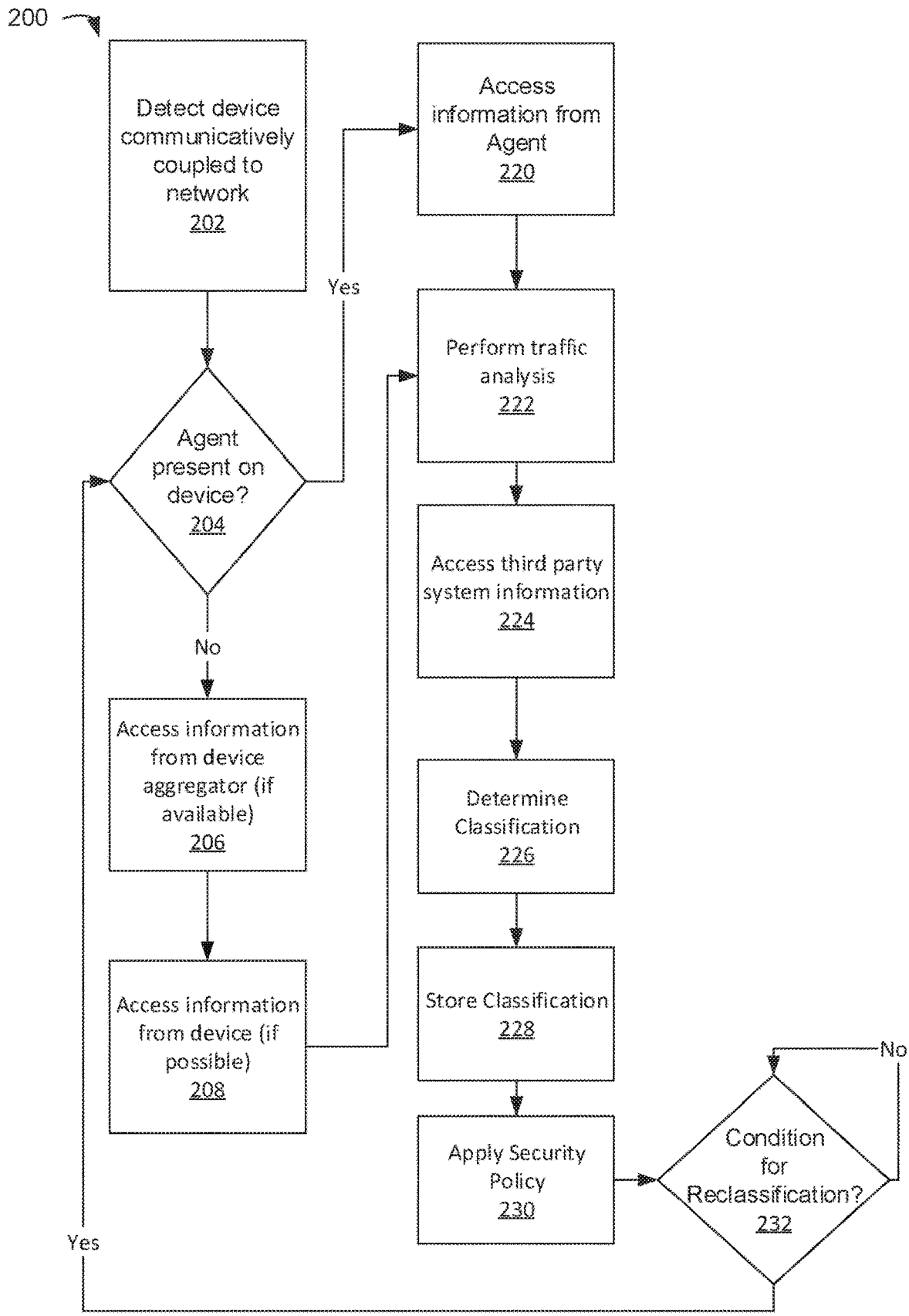
FIG. 2 depicts a flow diagram of aspects of a method for device classification in accordance with one implementation of the present disclosure.

With reference to FIG. 2, flowchart 200 illustrates example functions used by various embodiments. Although specific function blocks ("blocks") are disclosed in flowchart 200, such steps are examples. That is, embodiments are well suited to performing various other blocks or variations of the blocks recited in flowchart 200. It is appreciated that the blocks in flowchart 200 may be performed in an order different than presented, and that not all of the blocks in flowchart 200 may be performed.

FIG. 2 depicts a flow diagram of aspects of a method for device classification in accordance with one implementation of the present disclosure. The flow chart 200 of FIG. 2 may be performed by classifier device 102 or any system configured to perform device classification.

At block 202, a device communicatively coupled to a network is detected. The device may be detected as part of a periodic scan of the network (e.g., a scan of network 100 by classifier device 102) or the device may be detected upon being communicatively coupled to the network. The detecting of the device coupled to the network may include detecting the device in response to the device being recoupled to the network.

At block 204, whether an agent (e.g., agent 140) is present (e.g., installed) on the device is determined. This may be done by sending one or more packets to the device on a particular port that an agent is predetermined to be listening on, sending an API call, or combination thereof. If an agent is present on the device, block 220 may be performed. If an agent is not present on the device, block 206 may be performed.

At block 206, information or data from an aggregation device is accessed (if available). In some cases, the device to be classified is communicatively coupled to the network via an aggregation device (e.g., aggregation device 106). Information from the aggregation device may be accessed (e.g., queried) for use in classification, as described herein.

At block 208, information or data from the device to be classified is accessed. In some cases, an API or other method may be used to query the device in order to obtain information that may be used to classify the device.

At block 220, information from the agent is accessed. The agent may gather information about the device to be classified and send the information to a classifying device (e.g., classifier device 102).

At block 222, network traffic of the device to be classified is accessed and analyzed. The traffic data may be accessed from a network device (e.g., network device 104) or accessed from logs. For example, the logs may be accessed from the device being classified or from another device (e.g., aggregation device 106 or network device 104) communicatively coupled to the device being classified. The traffic data may include the internet protocol (IP) address, the media access control address (MAC address), information associated with one or more ports of the device configured to receive communications from the network, information associated with a service configured on the device, traffic data associated with the device determined based on passive traffic analysis (e.g., based on sniffing traffic), and traffic data associated with the device determined based on active traffic analysis (e.g., probing of ports). The passive traffic analysis may further include analysis of traffic of that includes communications to and from the device to be classified with other devices (e.g., on one or more networks). For example, the communications may be observed on the network or accessed from logs or other devices. Active traffic analysis may include analysis of traffic and analysis of behavior in response to communication that is sent to the device to be classified from the device performing classification. Active or passive traffic analysis may be a configurable option (e.g., user configurable). For example, the active or passive traffic analysis may be configurable on a per device basis or network segment basis.

Both active and passive traffic analysis may be performed. For example, passive traffic analysis can be performed in conjunction with the other information gathering to determine a classification and then active traffic analysis can be performed to confirm or fine tune the classification.

For example, the active traffic analysis can include a scan or probe of each TCP/IP port (e.g., by sending a SYN or synchronize packet) of the device to be classified to determine which ports are open. The open ports may then be used to determine which protocols the device being classified is using. For example, if port 80 is open then it may be determined that the device to be classified is a device that has a web server.

At block 224, remote, external, or third party system information about the device to be classified is accessed. As described herein, a variety of third party systems may be accessed to obtain as much information as possible about the device to be classified. The third party system can be a vulnerability assessment (VA) system, a thread detection (TD) system, a mobile device management (MDM) system, a firewall (FW) system, a switch system, and an access point (AP) system. The information accessed from third party system be stored in a data store (e.g., database) as described with respect to FIG. 4.

At block 226, a classification is determined. The classification may be determined based on a combination of the information received from an agent, an aggregation device, traffic analysis, and third party systems, as described herein.

At block 228, the classification is stored. The classification may be stored and updated periodically as more information about the device becomes available.

At block 230, a security policy is optionally applied. The application of the security policy to the classified device may be based on the device meeting particular criteria of the policy. Security policy actions may be applied in real-time.

A security policy may be created based on the classification of the device. For example, if the device classified is an industrial control system, a security policy may be configured according to a default security policy for industrial controls system which prevents the industrial control system from accessing the Internet.

At block 233, whether a condition for reclassification has occurred is determined. A condition for reclassification may include the passing of a time threshold (e.g., causing a periodic classification) or upon a device being coupled to the network or a different part of the network. The condition for reclassification may be a configurable frequency or interval. For example, the interval could be set to a relatively long period of time for a network that is expected to be relatively stable with a small number, if any, of new devices being introduced. The interval could also be set to a shorter period of time if the network is very dynamic and frequently has new devices being introduced.

If a condition for reclassification has occurred, block 204 is performed. For example, in response to a period of time passing, classification of the device may be performed again which could include accessing data associated with the device, where the data associated with the device comprises additional traffic data associated with the device and then determining another classification. If a condition for reclassification has not occurred, block 232 is performed.

The reclassification of a device may allow more accurate classification based on changes in the device. For example, if the device was classified without information from an agent but an agent is now installed on the device, the device may be reclassified based on the information received from the agent.

Figure 3:
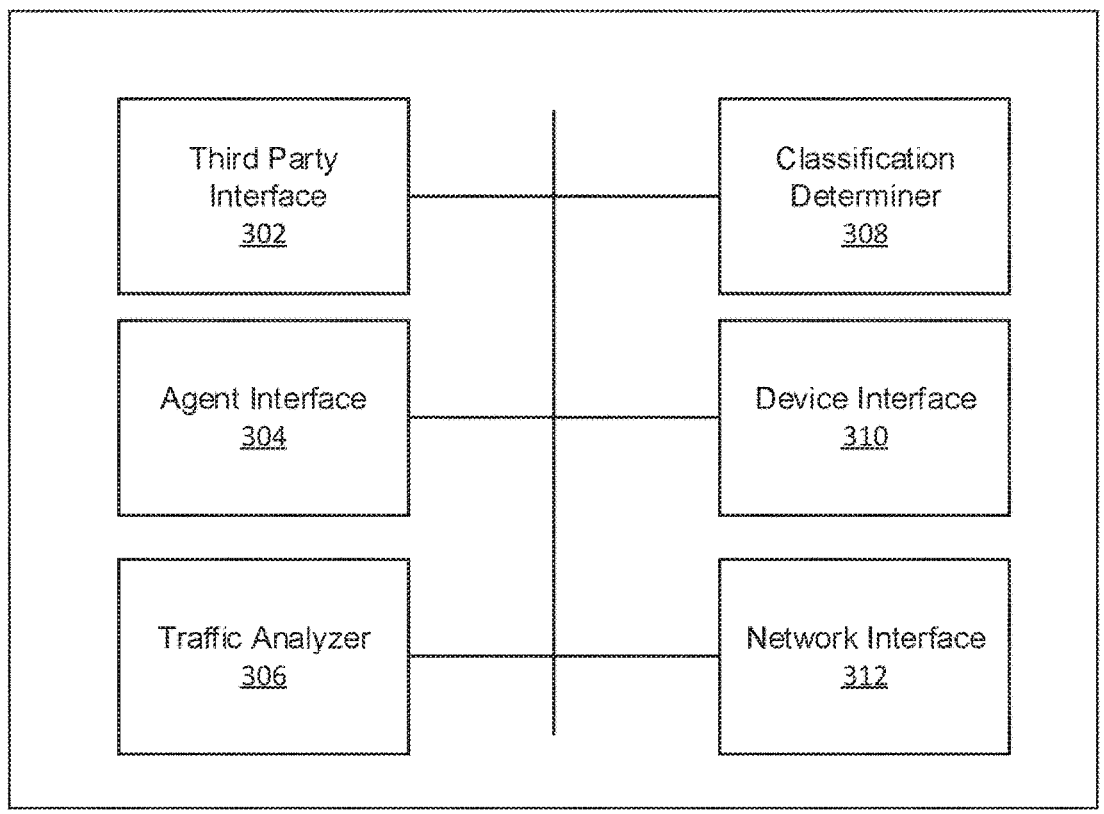
FIG. 3 depicts illustrative components of a system for device classification in accordance with one implementation of the present disclosure.

FIG. 3 illustrates example components used by various embodiments. Although specific components are disclosed in system 300, it should be appreciated that such components are examples. That is, embodiments of the present invention are well suited to having various other components or variations of the components recited in system 300. It is appreciated that the components in system 300 may operate with other components than those presented, and that not all of the components of system 300 may be required to achieve the goals of system 300.

FIG. 3 depicts illustrative components of a system for device classification in accordance with one implementation of the present disclosure. FIG. 3 shows an example system 300 including a third party interface 302, an agent interface 304, a traffic analyzer 306, a classification determiner 308, a device interface 310, and a network interface 312. The components of system 300 may be part of a computing system or other electronic device (e.g., classifier device 102) or a virtual machine and be configured to classify one or more devices communicatively coupled to a network. For example, the system 300 may further include a memory and a processing device, operatively coupled to the memory, which may perform the functions of or execute the components of system 300. The components of system 300 may access various data associated with a device to be classified in order to determine a classification of the device. It is appreciated that the modular nature of system 300 may allow the components to be independent and allow flexibility to enable or disable individual components or to extent/upgrade components without affecting other components thereby providing scalability and extensibility.

Third party interface 302 is configured to communicate with one or more third party, remote, or external systems to access information about a device to be classified. Third party interface 302 may further store the accessed information in a data store (e.g., device information database 402). For example, third party interface 302 may access log information from the third party systems and store the accessed information in the data store. Third party interface 302 may be configured to communicate with a vulnerability assessment (VA) system, a thread detection (TD) system, a mobile device management (MDM) system, a firewall (FW) system, a switch system, and an access point (AP) system.

Third party interface 302 may query a third party system using an API. For example, third party interface 302 query a firewall for information about a device or for a list of devices that are communicatively coupled to the firewall.

Agent interface 304 is configured to communicate with an agent (e.g., agent 140) of a device that is to be classified. Agent interface 304 can receive or access information gathered by the agent, as described herein.

Traffic analyzer 306 is configured to perform analysis of network traffic (e.g., in real-time) to and from a device to be classified. The traffic analyzer 306 may be configured to perform active or passive traffic analysis or a combination thereof. The traffic analyzer 306 may further be able to access and analyze traffic logs from one or more devices (e.g., network device 104, system 150, or aggregation device 106) or from the device to be classified. The traffic analyzer 306 may further be able to access traffic analysis data associated with the device to be classified, e.g., where the traffic analysis is performed by a third party system.

Classification determiner 308 is configured to determine a classification of a device based on information received from one or more components (e.g., third party interface 302, agent interface 304, traffic analyzer 306, classification determiner 308, device interface 310, and network interface 312) of system 300, as described herein. Classification determiner 308 may further store a device type classification of the device. Classification determiner 308 may be configured to determine the device type classification of the device periodically.

Classification determiner 308 may further determine a device classification based on data from an aggregation device (e.g., aggregation device 106) coupled to the device to be classified. For example, if the device to be classified is a network controllable light bulb, information may be received from a bridge device (e.g., aggregation device 106) configured to allow communication to the light bulb by bridging a computer network (e.g., wired or wireless) and a ZigBee™ communication channel with the light bulb. Classification determiner 308 can query the bridge device (e.g., via an API) for information including what devices are communicatively coupled to the bridge device (e.g., an inventory) and information about devices that are communicatively coupled to the bridge device. For example, an API could be used to query the device name and how the device is being addressed/what protocol is being used.

Classification determiner 308 may further use information about the bridge device to classify a device. For example, if the classification determiner 308 determines that the bridge device is configured to communicate with lighting devices based on an API call sent to the bridge device, classification determiner 308 may classify devices communicatively coupled to the network are lighting devices.

Device interface 310 is configured to interface with the device to be classified. Device interface 310 may communicate and query the device to be classified (e.g., via an API) to obtain information about the device to be classified.

Network interface 312 is configured to communicate with one or more devices (e.g., network device 104) coupled to a network that are coupled to system 300 and receive or access information about devices coupled to the network, as described herein. The network interface 312 may be configured to detect a device to be classified upon being coupled to the network.

The system 300 may be software stored on a non-transitory computer readable medium having instructions encoded thereon that, when executed by a processing device, cause the processing device to: detect a first device being coupled to a network and access data associated with the first device. The data associated with the device may comprise data from a second device (e.g., device 104 or 106 or system 150) coupled to the first device. The instructions may further cause the processing device to process, by the processing device, the data associated with first device to determine a classification for the first device and store the classification of the first device. An action may then be initiated based on the classification of the first device. The action based on the classification of the first device may comprise changing network access of the first device (e.g., changing the virtual local area network (VLAN)), creating a notification (e.g., a help desk ticket or sending an email) indicating that the first device with the classification has been added to the network, and monitoring traffic of the first device based the classification of the first device. For example, if the first device is classified as an MRI device, its network traffic may be monitored for suspicious activity, e.g., the MIII device attempting to access a social network website or communicate with a secure accounting server. As another example, if suspicious behavior is detected from a MM device, the action can be applied to isolate the MRI device from the secure network for further inspection and another action to send a notification to the information technology (IT) administrator can be performed as well. The actions can further include logging information related to the suspicious behavior, logging other device information, sending a message to a user (e.g., if the device supports receiving or presenting the message to a user), initiating a patching service (e.g., to patch software or firmware on the device), or initiating an update service (e.g., to update software or firmware on the device). Thus, the combining of multiple sources of information (e.g., traffic information, third party system information, and agent information (where available)) for increased accuracy, as described herein, allows actions to be efficiently tailored based on the classification.

The second device (e.g., aggregation device 106) may be configured to communicate with the processing device using a first protocol and the second device is configured to communicate with the first device using a second protocol.

Figure 4:
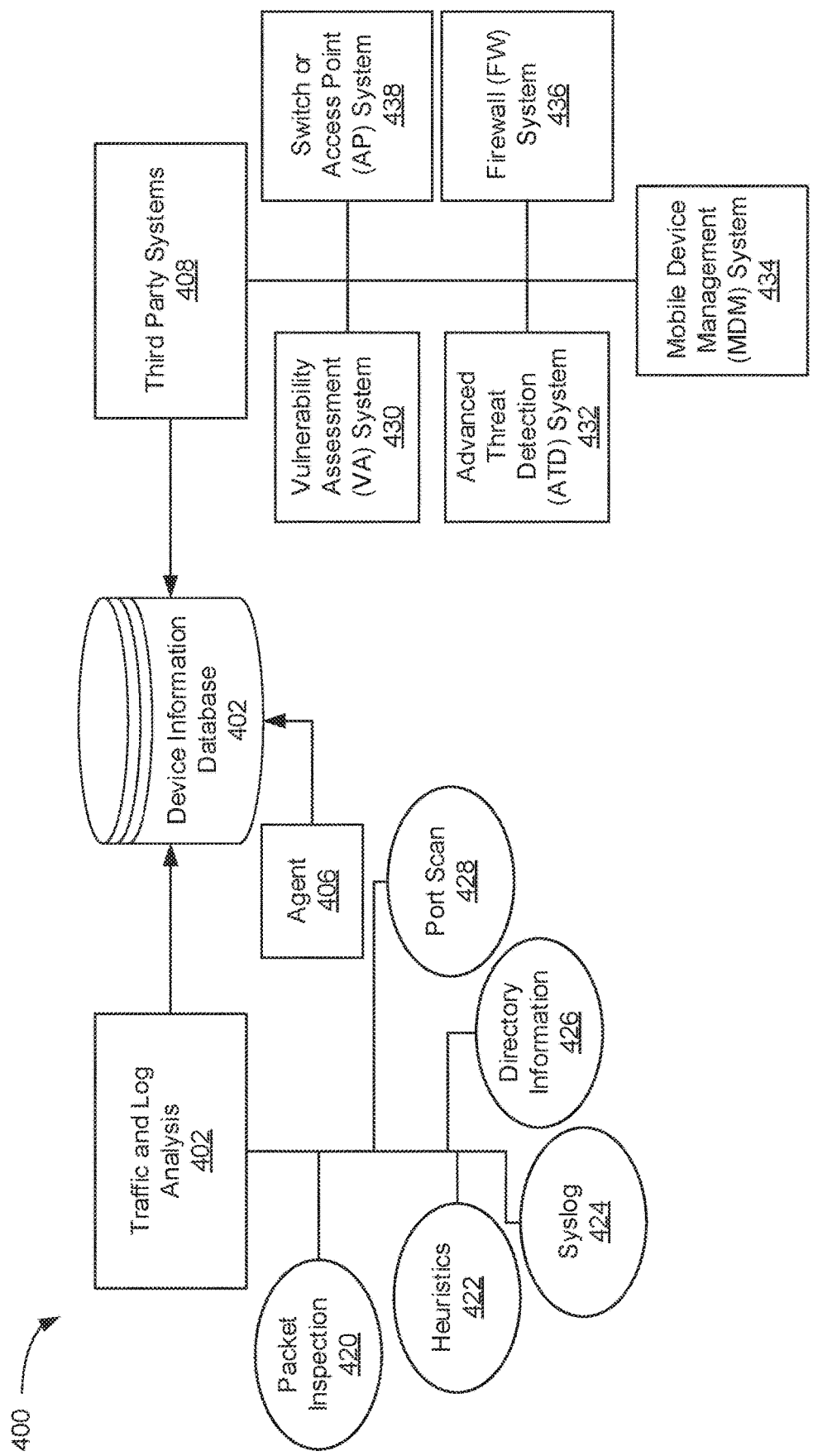
FIG. 4 depicts an exemplary data flow diagram of device information operable for use in device classification in accordance with aspects and implementations of the present disclosure.

FIG. 4 depicts an example data flow of device information operable for use in device classification in accordance with aspects and implementations of the present disclosure. FIG. 4 shows an example device information database 402 which is used to store device information which may then be used to classify a device. Device information database 402 may be maintained or used by a device (e.g., classifier device 102) that is configured to classify one or more devices coupled to a network.

The device information database 402 can be used to store information received or accessed from traffic and log analysis component 402 (e.g., traffic analyzer 306), an agent 406 (e.g., agent 140), and external, remote, or third party systems 408 (e.g., system 150).

Traffic and log analysis component 402 (e.g., traffic analyzer 306) may perform traffic analysis based on accessing packet inspection data 420, heuristics 422, syslog data 424, directory information 426, and port scan data 428. The traffic and log analysis component may provide comprehensive layer 2-layer 7 device information as well as device authentication information (e.g., device login information) and segmentation information (e.g., network segment such as a data center or accounting network address range).

Packet inspection data 420 includes traffic data based on packet inspecting including source and destination traffic information, MAC address, protocols information, port information, etc.

Heuristics 422 can be used by traffic and log analysis component 402 to perform traffic analysis on data accessed from packet inspection data 420, syslog data 424, directory information 426, and port scan data 428. Heuristic results can further be based on information including the operating system and version, firmware version, serial number, vendor (e.g., manufacturer), model, asset tag, software executing on a device (e.g., anti-virus software, malware detection software, office applications, web browser(s), communication applications, etc.) services that are active or configured on the device, ports that are open or that the device is configured to communicate with (e.g., associated with services running on device 130), MAC address, processor utilization, unique identifiers, computer name, etc. The heuristics 422 can apply different weight to each piece of information used in determining the classification of a device.

Syslog data 424 can include traffic and system logs stored according to the syslog messaging standard. Directory information 426 can include user information (e.g., from a lightweight directory access protocol (LDAP) or Active Directory). For example, if the user information is associated with an account for configuring a heating, air conditioning, and ventilation (HVAC) system, a device associated with that account may be determined to be a HVAC control device.

Port scan data 428 can include data from active scans of a device, e.g., scanning each port to determine if the port is open or the device is responding on that port. The port scan data 428 may be correlated with service information based on information of which services are associated with particular ports.

Agent 406 (e.g., agent 140) may execute on or may be coupled to a device to be classified and provide information about the device to be classified which is then stored in device information database 402. Agent 406 may be a trusted agent running on the device and be configured to collect information of the device, e.g., operating system version, network interface card vendor, etc. Whether an agent is present on a device itself can be used as a factor device classification. For example, when an agent is not present on the device, the classification of the device may be based on a list of devices that are not able to have agent.

External or remote systems 408 (e.g., system 150) may include one or more of a vulnerability assessment (VA) system 430, advanced thread detection (ATD) system 432, a mobile device management (MDM) system 434, a firewall (FW) system 436, a switch/access point (AP) system 438.

Vulnerability assessment (VA) system 430 is configured to identify, quantify, and prioritize (e.g., rank) the vulnerabilities of a device. VA system 430 may be able to catalog assets and capabilities or resources of a device, assign quantifiable value (or at least rank order) and importance to the resources, and identify the vulnerabilities or potential threats of each resource. VA system 430 may provide the aforementioned information for use in the device information database 402.

Advanced thread detection (ATD) or thread detection (TD) system 432 is configured to examine communications that other security controls have allowed to pass. ATD system 432 may provide information about a device to be classified including, but not limited to, source reputation, executable analysis, and threat-level protocols analysis.

Mobile device management (MDM) system 434 is configured for administration of mobile devices, e.g., smartphones, tablet computers, laptops, and desktop computers. MDM system 434 may provide information about mobile devices managed by MDM system 434 including applications, data, and configuration settings of the mobile devices and activity monitoring. MDM system 434 may be used get detailed mobile device information which can then be used for classification.

Firewall (FW) system 436 is configured to monitor and control incoming and outgoing network traffic based on security rules. The FW system 436 may provide information about a device to be classified including security rules related to the device to be classified and network traffic of the device to be classified.

Switch or access point (AP) system 438 may be any of a variety of network devices (e.g., network device 104 or aggregation device 106) including a network switch or an access point, e.g., a wireless access point, or combination thereof that is configured to provide a device access to a network. For example, the switch or AP system 438 may provide MAC address information, address resolution protocol (ARP) table information, device naming information, traffic data, etc., which are added to device information database 402. The system or AP system 438 may have one or more interfaces for communicating with IoT devices or other devices (e.g., ZigBee™, Bluetooth™, etc.), as described herein.

The VA system 430, ATD system 432, and FW system 436 may be accessed to get vulnerabilities, threats, and user information of the device to be classified in real-time which can then be used to determine accurate classification. Which information sources (e.g., the third party systems 408 and the agent 406) and how many information sources have data on a device to be classified can be used as a factor for classification. For example, a VA system, an ATD system, a FW system, or a combination thereof can report threats that are triggered on a device (e.g., a managed device). If each of the threats reported for a device are Microsoft Windows XP™ related threats, then this information can be used to accurately classify the device as a generally Microsoft Windows™ device or more specifically to be a Microsoft Windows XP™ device.

Figure 5:
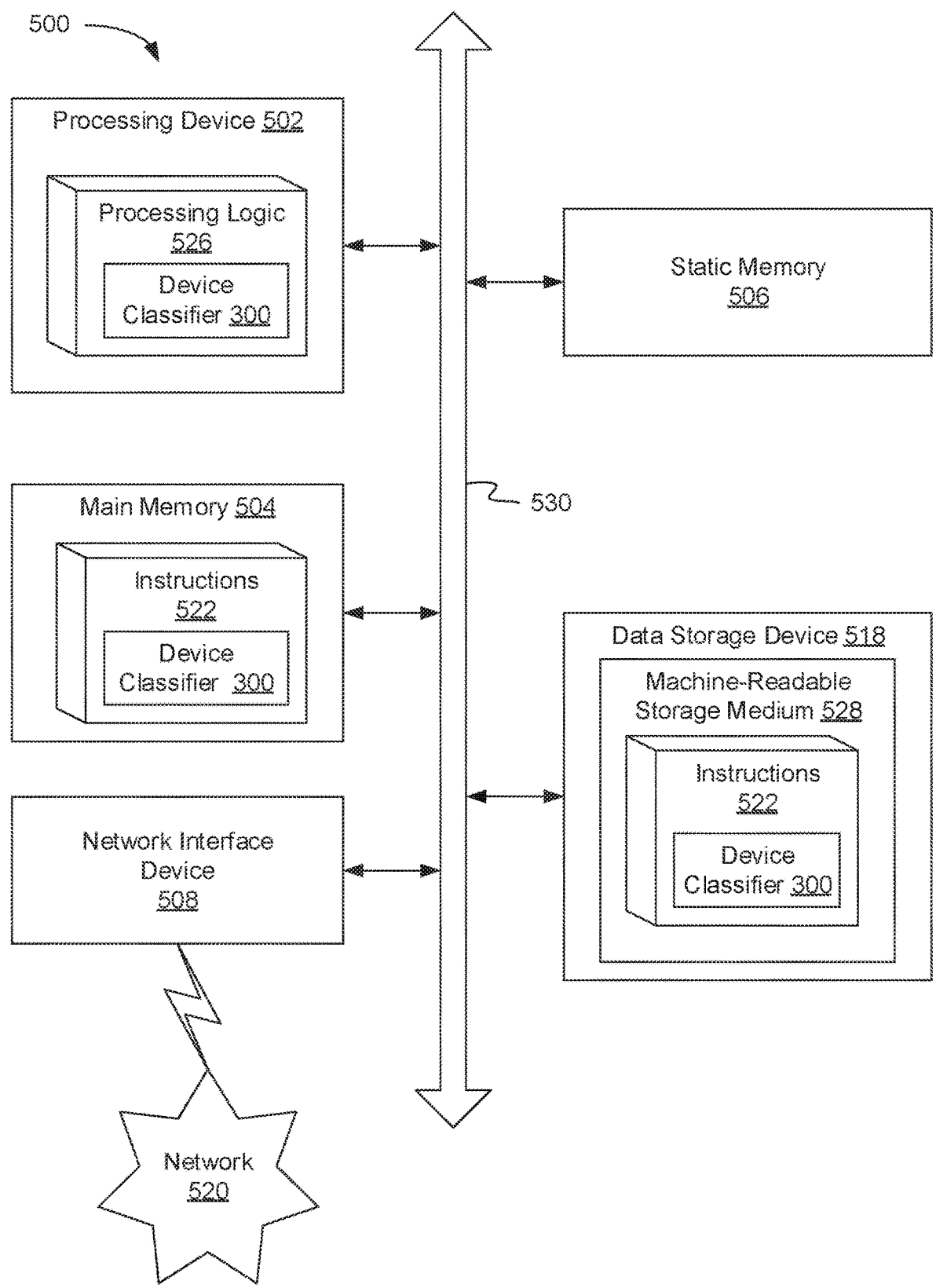
FIG. 5 is a block diagram illustrating an example computer system, in accordance with one implementation of the present disclosure.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server, such as classifier device 102 configured to perform device classification or system 300.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526, which may be one example of system 300 shown in FIG. 3, for performing the operations and steps discussed herein.

The data storage device 518 may include a machine-readable storage medium 528, on which is stored one or more set of instructions 522 (e.g., software) embodying any one or more of the methodologies of functions described herein, including instructions to cause the processing device 502 to execute device classifier 300. The instructions 522 may also reside, completely or at least partially, within the main memory 504 or within the processing device 502 during execution thereof by the computer system 500; the main memory 504 and the processing device 502 also constituting machine-readable storage media. The instructions 522 may further be transmitted or received over a network 520 via the network interface device 508.

The machine-readable storage medium 528 may also be used to store instructions to perform a method for device classification, as described herein. While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   detecting a device coupled to a network;
   retrieving, by a classifier device, device information from an external system associated with the device;
   determining, by the classifier device, a classification for the device based on the device information from the external system and traffic data associated with the device; and
   storing the classification for the device.

2. The method of claim 1 further comprising:
   initiating an action based on the classification of the device.

3. The method of claim 1, wherein the traffic data comprises information associated with a port of the device operable to receive communications from the network.

4. The method of claim 1, wherein the traffic data comprises information associated with a service of the device.

5. The method of claim 1, wherein the detecting of the device coupled to the network comprises detecting the device in response to the device being coupled to the network.

6. The method of claim 1, wherein the external system is selected from the group consisting of a vulnerability assessment system, a thread detection system, a mobile device management system, a firewall system, a switch system, and an access point system.

7. The method of claim 1, wherein determining the classification of the device is further based on data received from an agent installed on the device.

8. The method of claim 1, wherein determining the classification of the device is further based on data received from another device communicatively coupled to the device.

9. The method of claim 1, wherein the traffic data associated with the device is determined based on passive traffic analysis.

10. The method of claim 1, wherein the traffic data associated with the device is determined based on active traffic analysis.

11. The method of claim 1, wherein the classification is further based on a proximity of the device to another device.

12. The method of claim 1, wherein the classification is further based on an operating time of the device.

13. The method of claim 1 further comprising:
accessing data associated with the device, wherein the data associated with the device comprises additional traffic data associated with the device; and
determining another classification for the device based on the data associated with device.

14. A classifier system comprising:
a memory; and
a processing device of the classifier system, operatively coupled to the memory, to:
access data associated with a device, wherein the data associated with the device comprises traffic analysis data associated with the device and device information retrieved from an external system associated with the device;
determine a device type classification for the device based on the data associated with device; and
store the device type classification for the device.

15. The system of claim 14, wherein the processing device is further to determine the device type classification of the device periodically.

16. The system of claim 14, wherein the determination of the device type classification of the device based on the data associated with the device is further based on data from an aggregation device coupled to the device.

17. The system of claim 14, wherein the traffic analysis data is further based on at least one of active traffic analysis or passive traffic analysis.

18. A non-transitory computer readable medium having instructions encoded thereon that, when executed by a processing device of a classifier device, cause the processing device of the classifier device to:
access data associated with a first device coupled to a network, wherein the data associated with the device comprises data from a second device coupled to the first device;
retrieve device information associated with the first device from an external system associated with the device;
process, by the processing device, the data associated with first device and the device information retrieved from the external system to determine a classification for the first device;
store the classification of the first device; and
initiate an action based on the classification of the first device.

19. The non-transitory computer readable medium of claim 18, wherein the second device is operable to communicate with the processing device using a first protocol and the second device is operable to communicate with the first device using a second protocol.

* * * * *